Jan. 6, 1931.  A. M. STANLEY  1,788,174
DISK WHEEL AND METHOD OF MAKING THE SAME
Filed Oct. 3, 1925
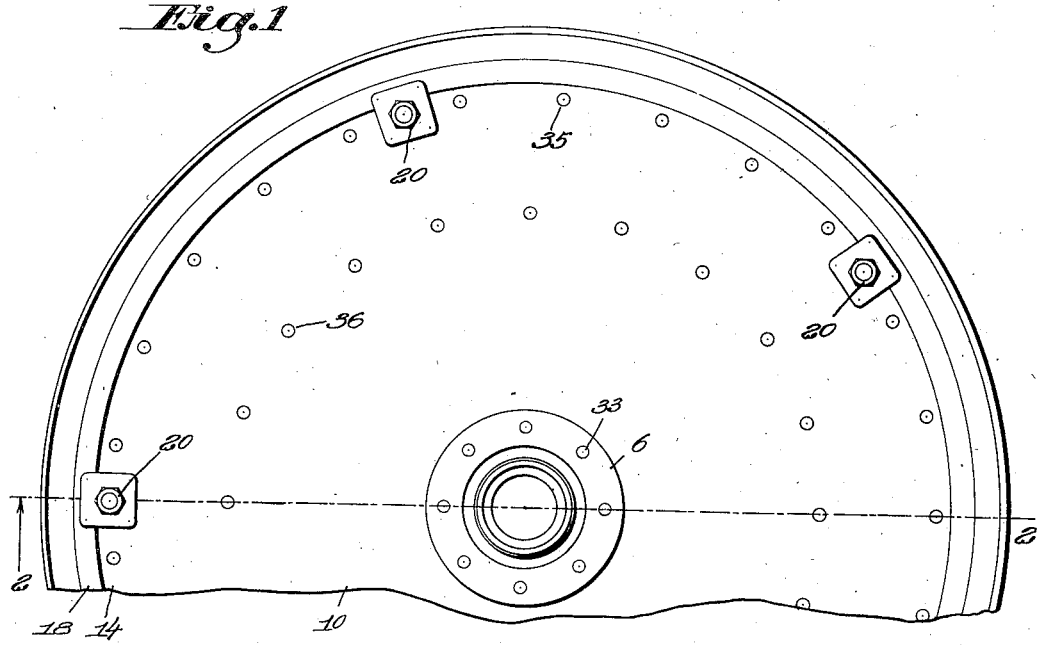
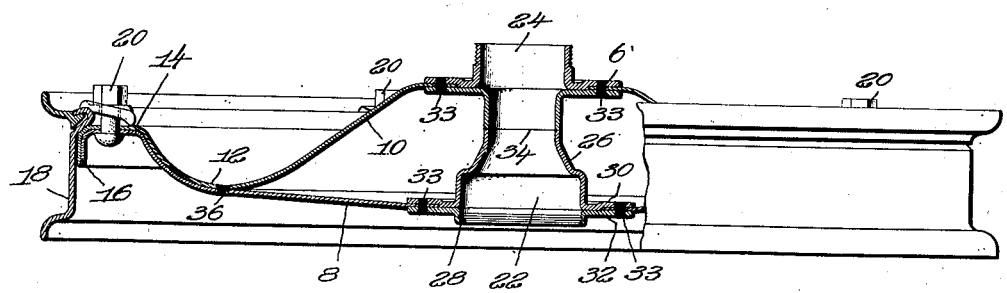
Witness
Frederick S. Greenleaf
Inventor
Arthur M. Stanley Patented Jan. 6, 1931

1,788,174

UNITED STATES PATENT OFFICE

ARTHUR M. STANLEY, OF LYNN, MASSACHUSETTS, ASSIGNOR TO STANLEY STEEL WELDED CORPORATION, OF BOSTON, MASSACHUSETTS, A CORPORATION OF DELAWARE

DISK WHEEL AND METHOD OF MAKING THE SAME

Application filed October 3, 1925. Serial No. 60,265.

The present invention relates to automobile wheels and methods of making the same and is more particularly concerned with wheels of the so called general disk type of construction.

Wheels of this type are commonly constructed of a single disk of metal secured at its center to a hub of suitable form and carrying at its periphery a rim for the reception of a tire. This type of wheel is open to objection because the disk, being connected only along a single line to the hub and rim, is necessarily of considerable thickness and weight to withstand the stresses usually encountered in the operation of the vehicle. Moreover, owing to the limitations placed on its construction to give sufficient strength and rigidity to the wheel, it cannot ordinarily be formed so as to present a pleasing appearance.

The object of the present invention is to provide a wheel of the disk type which is of comparatively light weight, of rigid and durable construction and attractive in appearance.

With this object in view, the principal feature of the present invention contemplates the provision of two disks arranged to carry a tire rim at the periphery and connected at their central portions to the opposite ends of a hub. This manner of connecting the disks to the hub provides an arched construction which is of exceedingly high strength and rigidity, even though material is used which is of considerably less weight and thickness than that commonly used with the single disk type of wheel. In the construction of the wheel according to the present invention, the disks are separately secured to two hub sections, or half hubs, which upon assembling of the wheel are internally welded together on a transverse plane. The shape of the hubs used in this construction permits the use of hub sections of drawn steel, thus eliminating the expensive machining operations ordinarily required in existing methods of manufacturing hubs. The wheel is further advantageous because, due to the strength imparted by the arched construction, the disks may be designed to give an attractive appearance without in any way impairing the strength of the wheel.

Further features of the invention consist in certain novel features of construction and modes of operation hereinafter described and particularly defined in the claims.

In the accompanying drawings, Fig. 1 is a side elevation of a portion of a front wheel embodying the several features of the present invention; Fig. 2 is an elevation partly in section on line 2—2 of Fig. 1; Fig. 3 is a sectional view taken through the hub of a rear wheel embodying the features of the present invention, being taken on line 3—3 of Fig. 4; and Fig. 4 is an elevation of the portion of the wheel shown in Fig. 3.

According to the preferred form of the present invention, the wheel consists of two disks which are arranged in engagement with each other near their periphery to constitute a felly for the reception of a demountable rim and which are welded to opposite ends of separate hub sections, constituting a central supporting means for the center of the disks. The hub sections are preferably of drawn steel and upon assembly of the wheel are internally butt welded by means of the welding machine disclosed in the copending application of Stanley and Sims, Serial No. 517,459, filed December 25, 1921. In order to increase the strength and rigidity of the wheel the disks are secured together between the periphery and center of the wheel, conveniently by means of a series of spot welds.

The illustrated embodiment of the invention as shown for a front wheel in Figs. 1 and 2 comprises a hub that is of the general size and shape of the usual form of hub for attachment to the front axle of a vehicle, an inner disk 8 and an outer disk 10 secured to the inner and outer ends respectively of the hub 6. As shown in Fig. 2, the disks are constructed to give an arched formation to the wheel, the inner disk 8 fitting within the outer disk 10 for a substantial distance from the periphery toward the center. The disks are conveniently formed of pressed sheet metal and are constructed to form a curved portion 12 between the periphery and the hub, an annular flanged portion 14 and a laterally extended portion 16, which latter constitutes an integral felly for the reception of a demountable rim 18, the rim being adapted to be secured in place by clamping bolts 20 arranged upon the annular portion 14 of the disks. Referring again to the hub 6, it will be seen that it comprises two sections indicated generally at 22 and 24, of which the former is connected to the inner disk 8 and the latter to the outer disk 10. Each section comprises an internal or barrel portion, and an external or cap portion, which parts for the section 22 are indicated at 26 and 28 respectively. The barrel and cap portions are each provided with a radially extended annular flange indicated at 30 and 32 between which the central portion of the inner disk 8 is secured by a series of spot welds 33. The section 24 is of similar construction having barrel and cap portions between flanges of which the outer disk 10 is secured. The separate parts of each hub section are preferably of drawn steel, the formation of which is permitted by the shape of the various portions of the hub. The two hub sections are then butted together, the inner disk 8 at this time being received within the outer disk 10 in the position shown in Fig. 2, and the hub sections are welded together to form a completed hub, this operation being preferably carried out on the machine disclosed in the above mentioned Stanley and Sims application in such a manner that the opposing sections are firmly butt-welded together on the line 34. The disks are secured together between the periphery and the center of the wheel by means of a series of spot welds indicated at 35 which are formed on the annular flanged portion 14 of the disks and also by a series of spot welds 36 on the curved portion 12 of the disks. The wheel is then complete, except for painting or other finishing, and is ready for the reception of the demountable rim.

A rear automobile wheel may be constructed in the same manner as the front wheel above described. However, owing to the possible inequalities arising from the weld of the hub sections, it is preferable to employ an integral machined sleeve for attachment of the wheel to the axle. Referring to Figs. 3 and 4 showing a portion of the rear wheel adjacent to the hub, the hub sections indicated at 22 and 24 are welded together as before along the line 34. The barrel portion of the hub is preferably of hexagonal contour as shown in Fig. 4. Received within the hub is the sleeve 37 to provide for securing the wheel to the axle, the sleeve having a hexagonal external contour to conform to the inner surface of the hub and being provided with the usual keyway 38. After insertion of the hub, the sleeve is welded to the hub at both ends, as indicated at 40 and 42.

Provision is also made for attaching a brake drum to the rear wheel. To this end the inner disk 8 and the flanges 30 and 32 of the inner hub section are provided with a series of keyhole slots, each consisting of a circular bolt head receiving portion 44 and an elongated radial shank receiving portion 46 to receive a bolt 48. The brake drum 50 is provided with a series of openings adapted to receive the bolts 48 when the latter are inserted in the elongated portions of the keyhole slots, and the brake drum may then be secured in place by the use of nuts, as indicated in Fig. 3. This mode of attaching the brake drum affords a simple and convenient construction and in no way mars the appearance of the wheel, because the heads of the bolts, not protruding through the outer disk, are entirely hidden from view.

Although the invention has been illustrated and described as embodied in a wheel having disks secured to a hub of the usual size and shape for attachment to the axle of the vehicle, the invention is not to be considered as so limited, but to include other combinations and arrangements except as limited in scope by the claims.

I claim:

1. An automobile wheel comprising two hub sections, each consisting of a barrel portion and a cap portion, and a disk welded between the barrel portion and the cap portion of each section, the barrel portions of the hub sections being internally welded together.

2. An automobile wheel comprising two hub sections, each consisting of a drawn metal barrel portion and a cap portion, two disks of similar conformation near the periphery and welded between the barrel portions and the cap portions of the hub sections, the disks being welded together near the periphery, and the hub sections being internally welded together.

3. An automobile wheel comprising two hub sections, each consisting of a barrel portion and a cap portion, two dished disks of similar conformation near the periphery and welded between the barrel portions and the cap portions of the hub sections to form an arched wheel construction, the barrel portions of the hub sections being internally welded together, and the disks being spot-welded near the periphery.

4. An automobile wheel comprising a hub consisting of two internally welded hub sections, disks welded to opposite ends of the hub, and an axle receiving sleeve received within the hub and welded thereto at opposite ends.

5. An automobile wheel comprising a hub, a disk secured to the hub and provided with a plurality of slots, each having an enlarged bolt receiving portion and an elongated portion, bolts received in the slots, and a brake drum having openings for reception of the bolts for securing the brake drum to the disk.

6. An automobile wheel comprising a hub, two disks secured to the hub, one of which is provided with a plurality of slots, each consisting of an enlarged bolt receiving portion and an elongated portion, a brake drum having openings registering with the elongated portions of the slots, and means engaging in the openings for securing the brake drum to the disk.

7. An automobile wheel comprising a hub, disks secured at opposite ends of the hub, a brake drum, and means engaging internally of one of the disks for securing the brake drum to the wheel.

8. A method of making an automobile wheel which consists in welding an outer disk to a hub section, welding an inner disk to a second hub section, and internally welding the hub sections together.

9. A method of making an automobile wheel which consists in welding an outer disk between the barrel portion and the cap portion of a hub section, welding an inner disk between similar portions of a second hub section, and internally welding the two hub sections together.

10. A method of making an automobile wheel which consists in welding two disks to separate hub sections, internally welding the hub sections together, and welding the disks together near the periphery.

11. A method of making an automobile wheel which consists in welding two disks between barrel and cap portions of separate hub sections, welding the hub sections together internally, and spot-welding the disks together near the periphery.

12. An automobile wheel comprising two hub sections each having an outer radially extended flange, a disk welded to the flange of each of the hub sections, the hub sections being internally welded together.

13. An automobile wheel comprising a hub, disks secured at opposite ends of the hub, a brake drum and means adapted to be inserted externally and to engage internally of one of the disks for securing the brake drum to the wheel.

In testimony whereof I have signed my name to this specification.

ARTHUR M. STANLEY.

CERTIFICATE OF CORRECTION.

Patent No. 1,788,174.  Granted January 6, 1931, to

ARTHUR M. STANLEY.

It is hereby certified that the assignee in the above numbered patent was erroneously described and specified as "Stanley Steel Welded Corporation" whereas said assignee should have been described and specified as Stanley Steel Welded Wheel Corporation, of Boston, Massachusetts, a corporation of Massachusetts, as shown by the records of assignments in this office; and that the said Letters Patent should be read with this correction therein that the same may conform to the record of the case in the Patent Office.

Signed and sealed this 31st day of March, A. D. 1931.

(Seal)

M. J. Moore,
Acting Commissioner of Patents.